US011386686B2

(12) United States Patent
Zhang

(10) Patent No.: US 11,386,686 B2
(45) Date of Patent: Jul. 12, 2022

(54) METHOD AND APPARATUS TO ESTIMATE IMAGE TRANSLATION AND SCALE FOR ALIGNMENT OF FORMS

(71) Applicant: KONICA MINOLTA BUSINESS SOLUTIONS U.S.A., INC., San Mateo, CA (US)

(72) Inventor: Yongmian Zhang, San Mateo, CA (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 14 days.

(21) Appl. No.: 16/836,778

(22) Filed: Mar. 31, 2020

(65) Prior Publication Data

US 2021/0303839 A1 Sep. 30, 2021

(51) Int. Cl.
| | |
|---|---|
| *G06V 30/414* | (2022.01) |
| *G06V 10/24* | (2022.01) |
| *G06V 30/224* | (2022.01) |
| *G06V 30/416* | (2022.01) |
| *G06V 30/40* | (2022.01) |

(52) U.S. Cl.
CPC ........... *G06V 30/414* (2022.01); *G06V 10/24* (2022.01); *G06V 30/224* (2022.01); *G06V 30/416* (2022.01); *G06V 30/43* (2022.01)

(58) Field of Classification Search
None
See application file for complete search history.

(56) References Cited

U.S. PATENT DOCUMENTS

| | | | |
|---|---|---|---|
| 6,778,703 B1 * | 8/2004 | Zlotnick | G06K 9/00449 |
| | | | 382/218 |
| 8,880,540 B1 * | 11/2014 | Sampson | G06V 10/75 |
| | | | 707/758 |
| 2017/0147552 A1 * | 5/2017 | Carroll | G06K 9/6203 |
| 2017/0316578 A1 * | 11/2017 | Fua | G06T 7/246 |
| 2019/0065833 A1 * | 2/2019 | Wang | G06K 9/00288 |

* cited by examiner

*Primary Examiner* — David Perlman
(74) *Attorney, Agent, or Firm* — Squire Patton Boggs (US) LLP

(57) ABSTRACT

Method and apparatus to match bounding boxes around text to align forms. The approach is less computationally intensive, and less prone to error than text recognition. For purposes of achieving alignment, information per se is not as important as information location. Information within the bounding boxes is not as critical as is the location of the area which the bounding boxes occupy. Scanning artifacts, missing characters, or noise generally do not affect bounding boxes themselves so much as they do the contents of the bounding boxes. Thus, for purposes of form alignment, the bounding boxes themselves are sufficient. Using bounding boxes also avoids misalignment issues that can result from stray marks on a page, for example, from holes punched in a sheet, or from handwritten notations.

20 Claims, 8 Drawing Sheets

FIG. 2A (Prior Art)

| | | |
|---|---|---|
| 211 | Jane Doe | |
| 212 | Office of the Treasurer | |
| 213 | XYZ Corp. | |
| 214 | Statement of Account | |
| 215 Name | Field 1 | 225 |
| 216 Title | Field 2 | 226 |
| 217 Account No. | Field 3 | 227 |
| 218 Amount | Field 4 | 228 |

Field 5 231

Field 6 241

| | | |
|---|---|---|
| 211 | Jane Doe | |
| 212 | Office of the Treasurer | |
| 213 | XYZ Corp. | |
| 214 | Statement of Account | |
| 215 Name | John Roe | 225' |
| 216 Title | Vice President, Finance | 226' |
| 217 Account No. | 1234 5678 9012 | 227' |
| 218 Amount | $67.49 | 228' |

7890 1234 5678  231'

1X23Y ACCOUNT 6Z23R   241'

| | | |
|---|---|---|
| 411 | Jane Doe | |
| 412 | Office of the Treasurer | |
| 413 | XYZ Corp. | |
| 414 | Statement of Account | |
| 415 | Name | Field 1 | 425 |
| 416 | Title | Field 2 | 426 |
| 417 | Account No. | Field 3 | 427 |
| 418 | Amount | Field 4 | 428 |

Field 5   431

Field 6   441

FIG. 4B

| | | |
|---|---|---|
| 411' | Jane Doe | |
| 412' | Office of the Treasurer | |
| 413' | XYZ Corp. | |
| 414' | Statement of Account | |
| 415' | Name | John Roe | 425' |
| 416' | Title | Vice President, Finance | 426' |
| 417' | Account No. | 1234.5678.9012 | 427' |
| 418' | Amount | $67.49 | 428' |

7890.1234.5678   431'

1X23Y ACCOUNT 6Z29R   441'

METHOD AND APPARATUS TO ESTIMATE IMAGE TRANSLATION AND SCALE FOR ALIGNMENT OF FORMS

BACKGROUND OF THE INVENTION

Aspects of the present invention relate to form processing, and more particularly, to method and apparatus for estimating image positioning, translation, and scale to facilitate form alignment.

FIG. 1 shows a general process flow for form processing. In particular, FIG. 1 shows a process for form automation, to convert document images into editable electronic formats which can be exported into information management systems.

FIG. 1 depicts two aspects of form processing. Below the dotted line are steps to register form fields to enable the provision of templates. Below the dotted line, at 110 a blank form, with fields to be filled in, is input. Scanning of the form into the system occurs at 112, with form images being output. Registration of fields in the form occurs at 114. Form templates are generated at 116, with keywords being identified.

Above the dotted line are steps to enable filling in of forms. At 110', a filled-in form, with fields like the ones in blank form 110, is input. Scanning occurs at 112, with form images being output. At 122, the type of form being processed is identified. At 124, using information from the form templates action at 116, a layout analysis is performed. Concurrently with the form identification and layout analysis, text from the filled in form is recognized at 126, and the recognized text is exported to a database at 150.

The overall process associates filled-in contents with field labels in a pre-defined template. In order to achieve this association accurately, it is important to align a template and a corresponding filled-in form. FIGS. 2A and 2B illustrate examples of a template 200 (FIG. 2A) and a filled in form (FIG. 2B).

In FIG. 2A, form 200 contains text 211-218. Text 211-214 are just part of the form 200. Text 215-218 are provided in places where data is to be filled in, at fields 225-228. Fields 231 and 241 are additional fields, with no text associated with them, at which data is to be filled in. In FIG. 2B, text 211-218 is the same, and is in the same place as in FIG. 2A. Fields 225'-228' are filled in fields, containing data corresponding to text 215-218. Fields 231' and 241' likewise are filled in with data.

In one known approach to accomplishing registration of blank and filled in forms, features or points may be taken from a template or reference image by using a technique such as Scale Invariant Feature Transform (SIFT) or Speed up Robust Feature (SURF). Features or points also may be taken from a filled-in template or form in the same manner. It is possible to find correspondence between the template and a filled-in form by matching feature descriptions based on a Euclidean distance of their feature vectors.

Using this known technique, a subset of keypoints on a template image that match a subset of keypoints in an input image may be identified as providing a good match between the template image and the input image. These pairs of points then can be used to calculate a transformation matrix to accomplish form image alignment. However, where there are errors or omissions in any characters or other portions of the images to be matched, matching errors can occur.

Even where there are no scanning or related errors, feature points extracted from text in a document image may be similar, and may not be distinguishable, so that proper corresponding points between two images cannot be established. FIG. 3 shows an example of a scenario in which a mismatch may occur. In FIG. 3, the letter E and F share common feature points 312, 322 and 314, 324. However, feature point 316 in the letter E does not appear in the letter F, but it does appear in the letter L (feature point 326). As a result, though an image may have different characters such as E, F, and L, the respective feature descriptions of these characters may be such that the feature point alignment technique will not work.

A pixel-based alignment technique finds a pair of pixels that agree by matching pixel descriptions (for example, characteristics of neighboring pixels). This technique may determine that there is alignment where the greatest number of pixels agree between two images. Looking at a subset of pixels on a template image, agreement with a subset of pixels in an input image may identify the input image as a good match for the template. The pairs of matching points can be used to calculate a transformation matrix for image alignment.

When one document image is completely or partly filled in, and another document image has only field labels, pixel-based alignment may be difficult to apply, even before taking into account the computational intensity of the approach, because there will be a lot of disagreement between pixels of the respective images, even though the images are based on the same form. Some scanned text images can include scan artifacts, noise, missing characters, blurring, and the like. In addition, image text can have uniform intensity, such that the characteristics of neighboring pixels are not distinguishable. As a result, it can be difficult to find accurate pixel correspondence between an input image and its template (reference) image.

It would be desirable to provide an image alignment method and apparatus that does not rely as much on specific image content, and more on position of items on a sheet. In addition, it would be desirable to provide a form alignment approach that is more robust and accurate.

SUMMARY OF THE INVENTION

In view of the foregoing, aspects of the present invention focus on position of items on a sheet. Rather than focusing on features or on matching groups of pixels, in an embodiment the focus is on common areas of a template and form, and in particular on the shapes of those areas. Matching of those shapes can speed up alignment and can facilitate placement of information to fill out a template.

In one aspect, embodiments of the invention take advantage of the intersection over union approach to align forms. As will be appreciated from the more detailed discussion herein, using bounding boxes involves text identification, which is less computationally intensive, and less prone to error than text recognition. For purposes of achieving alignment, information per se is not as important as information location. In the context of bounding boxes, information within the bounding boxes is not as critical as is the area which the bounding boxes occupy. Scanning artifacts, missing characters, or noise generally do not affect bounding boxes themselves so much as they do the contents of the bounding boxes. Thus, for purposes of form alignment, the bounding boxes themselves are sufficient.

Using bounding boxes also avoids misalignment issues that can result from stray marks on a page, for example, from holes punched in a sheet, or from handwritten notations.

BRIEF DESCRIPTION OF THE DRAWINGS

FIGS. 2A and 2B shows samples of a template and a filled-in form;

FIGS. 4A and 4B show examples of image alignment employing bounding boxes in accordance with an embodiment;

DETAILED DESCRIPTION

Figure 1:
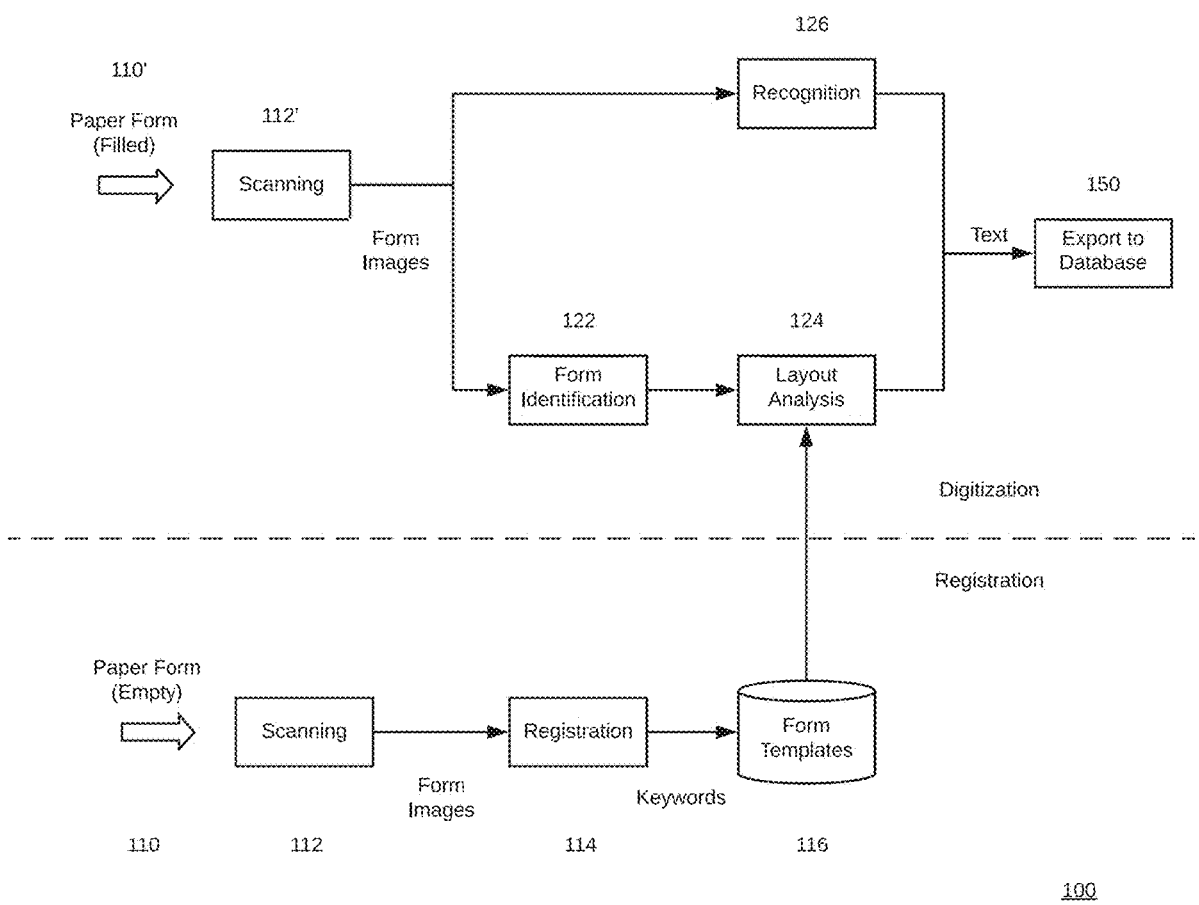
FIG. 1 exemplifies apparatus and process flow for handling templates and filled-in forms.
Figure 3:
FIG. 3 shows examples of potential errors in feature-based alignment.

Definitions and placement of word bounding boxes generally are less affected by scan artifacts, noise, missing characters, and the like. In addition, for purposes of image alignment, it may be unnecessary to detect specific image features within a defined bounding box. To the extent it is necessary to extract such specific image features, particularly words, from bounding boxes, such extraction may be accomplished using any of a variety of techniques that will be well known to ordinarily skilled artisans. Aspects of the present invention focus on image identification rather than on image recognition. This focus enables the use of bounding boxes to determine alignment. Looking at FIGS. 4A and 4B for example, FIG. 4A shows extraction of bounding boxes from a template image, and FIG. 4B shows extraction of bounding boxes from an input image. If the template image in FIG. 4A is well aligned to the input image as shown in FIG. 4B, the overall amount of overlap of bounding boxes of words between the template image and the input image will be large, and sufficiently close to 100% to determine that there is alignment. To make this determination, one approach in accordance with an embodiment is to optimize intersection over union between the template image and the input image, where the intersection over union figure is calculated based on the bounding boxes of words in the two images.

In general, the formula for intersection-over-union can be expressed as follows:

$$IoU = \frac{I(X)}{U(X)}$$

I(X), the intersection of bounding boxes, represents the overlap of a bounding box for a template image and a corresponding bounding box for an input image, and may be represented as follows:

$$I(X) = \sum_{v \in V} X_v * Y_v$$

U(X), the union of bounding boxes, represents the total area covered by the bounding box for the template image and the corresponding bounding box for the input image, and may be represented as follows:

$$U(X) = \sum_{v \in V} (X_v + Y_v) - X_v * Y_v$$

That is, looking at the areas covered by the respective bounding boxes, the overlap has to be accounted for. That is why, in the equation for the union, the intersection amount is subtracted from the sum of the areas.

If there is perfect alignment between the respective bounding boxes for the template image and the input image, the intersection will be the same as the union, and IoU will equal 1. However, as a practical matter, IoU will not equal 1, for any of several reasons. For example, the bounding boxes for the template image and the input image may be out of alignment, and/or may be of different sizes. In those circumstances, there will be some amount of loss, where the intersection of the two images will be less than the union of the two images. The difference between the two, which may be termed as IoU loss $L_{IoU}$, may be defined as follows:

$$L_{IoU} = 1 - \frac{I(X)}{U(X)}$$

Alignment and size are two different issues, which may appear together, or may appear separately. Correcting alignment is a matter of needing to translate one or both of the template and input images, either horizontally or vertically or, in some instances for input images, rotationally, to align the bounding boxes. In an embodiment, an input image may be rotated before attempting to determine the degree of alignment with the template image. Correcting size is a matter of needing to scale one or both of the template and input images to make them larger or smaller so that the bounding boxes are the same size.

Looking at alignment first, it is necessary to examine the amount of relative horizontal translation and vertical translation between bounding boxes. The horizontal and vertical translation can be found to optimize the following equation:

$$\arg\min_{\Delta x, \Delta y} L_{IoU}$$

where $\Delta x$ represents horizontal translation and $\Delta y$ represents vertical translation.

Looking at bounding boxes of words or characters, the above equation can be expressed as follows:

$$\arg\min_{\Delta x, \Delta y} \sum_i^n \sum_j^m \frac{I(r_i(x+\Delta x, y+\Delta y), r_j(x, y))}{U(r_i(x+\Delta x, y+\Delta y), r_j(x, y))}$$

where n and m are the number of bounding boxes for a template image and an input image, respectively; $r_i$ and $r_j$ are bounding boxes for a template image and an input image, respectively; and x, y are the coordinates of the top-left corner of a bounding box.

Figure 5A:
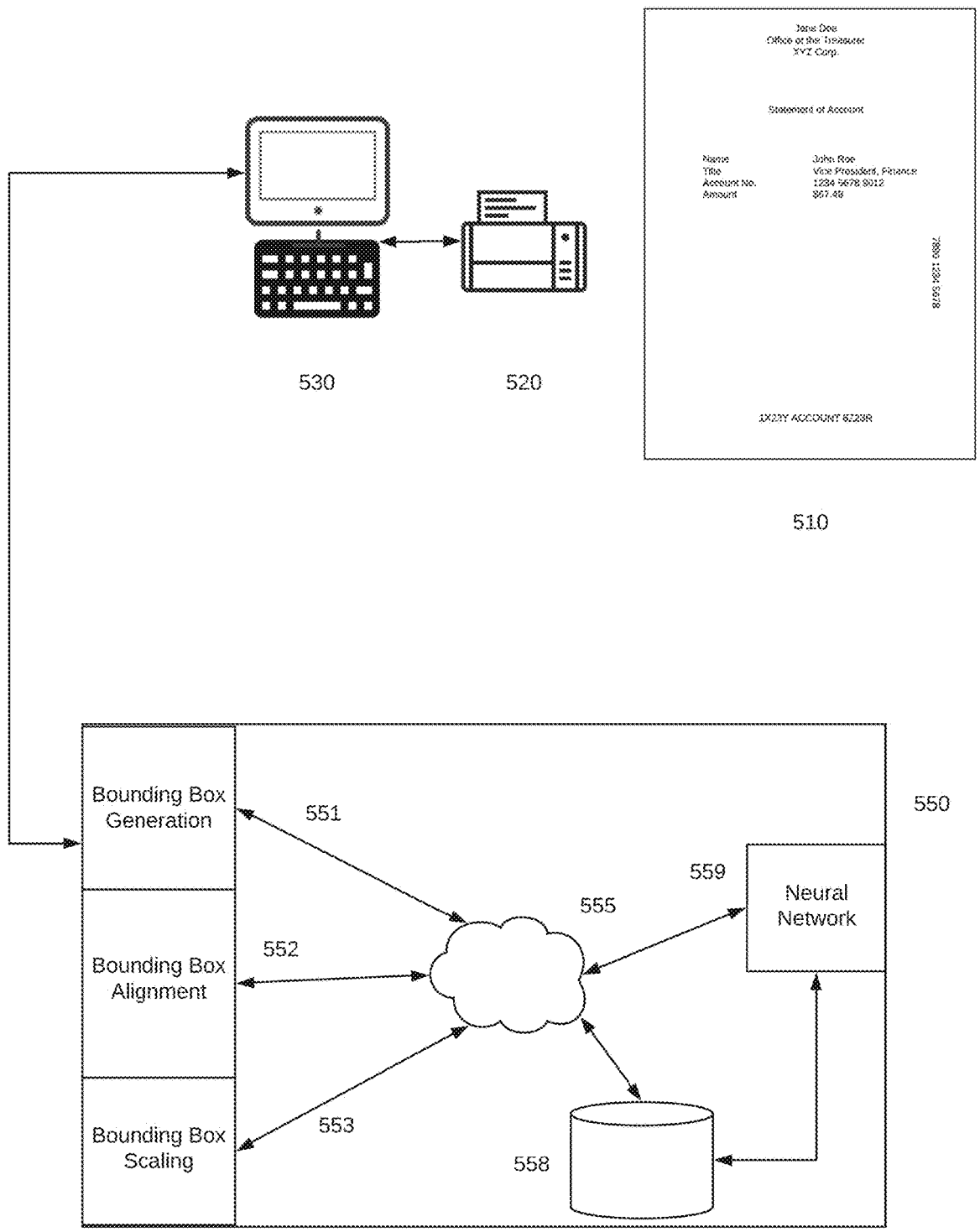
FIG. 5A is a high level diagram depicting a form alignment and scaling system according to an embodiment.

FIG. 5A is a high level block diagram of a system to implement the method described herein. In FIG. 5, an input form 510, similar to what is shown in FIG. 2B, is input via scanner 520, which may be connected to computing system 550 either directly or through other computing apparatus 530. Scanning input form 510 produces an input image on which computing system 550 will perform scaling and alignment. In an embodiment, computing system 550 stores template images in storage 558. In one aspect, a neural network 559 may be trained to perform the scaling and alignment.

Figure 5B:
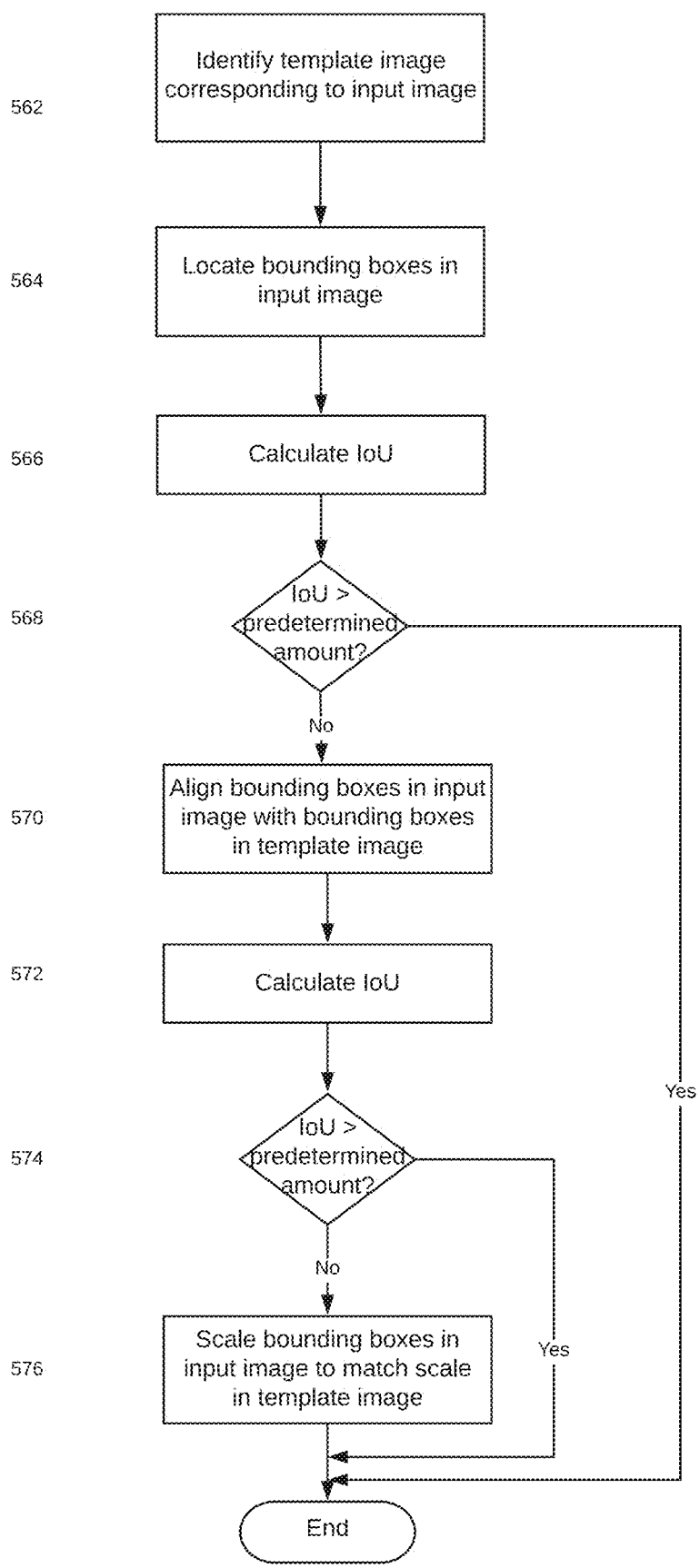
FIG. 5B is a high level flow chart depicting steps in form alignment and scaling according to an embodiment.

In an embodiment, computing system 550, which may or may not include neural network 559, will generate a bounding box around each of one or more areas in the input image FIG. 5B is a high level flow diagram to describe the alignment and scaling operation. At 562, a template image corresponding to an input image is identified. At 564, one or more bounding boxes are located in the input image. In an embodiment, because the template image is stored previously, bounding boxes are already located for that image. In another embodiment, bounding boxes also are determined for that template image. At 566, intersection over union (IoU) for a first bounding box for each of the input image and template image is calculated. At 568, if IoU exceeds a predetermined amount, the system 550 may determine that the input image is satisfactorily scaled with the template image, and the flow ends. If not, at 570 the first bounding box for the input image is aligned with the first bounding box for the template image, in a manner to be described below with respect to FIG. 6. In an embodiment, after that alignment, at 572 IoU is calculated again, and at 574 that calculated IoU is checked to see if it exceeds a predetermined amount. If so, the system 550 may determine that scaling is not required, and the flow ends. If not, at 576 scaling is performed on the bounding box for the input image relative to the corresponding bounding box in the template image.

It should be noted that, if an input image and its template image are scanned through the same scanner, scaling should not be necessary. Whether the same scanner is used may not be known. In an embodiment, metadata regarding the scanner used to generate the input image is provided to computing system 550, and is compared with corresponding metadata for the template image.

Figure 6:
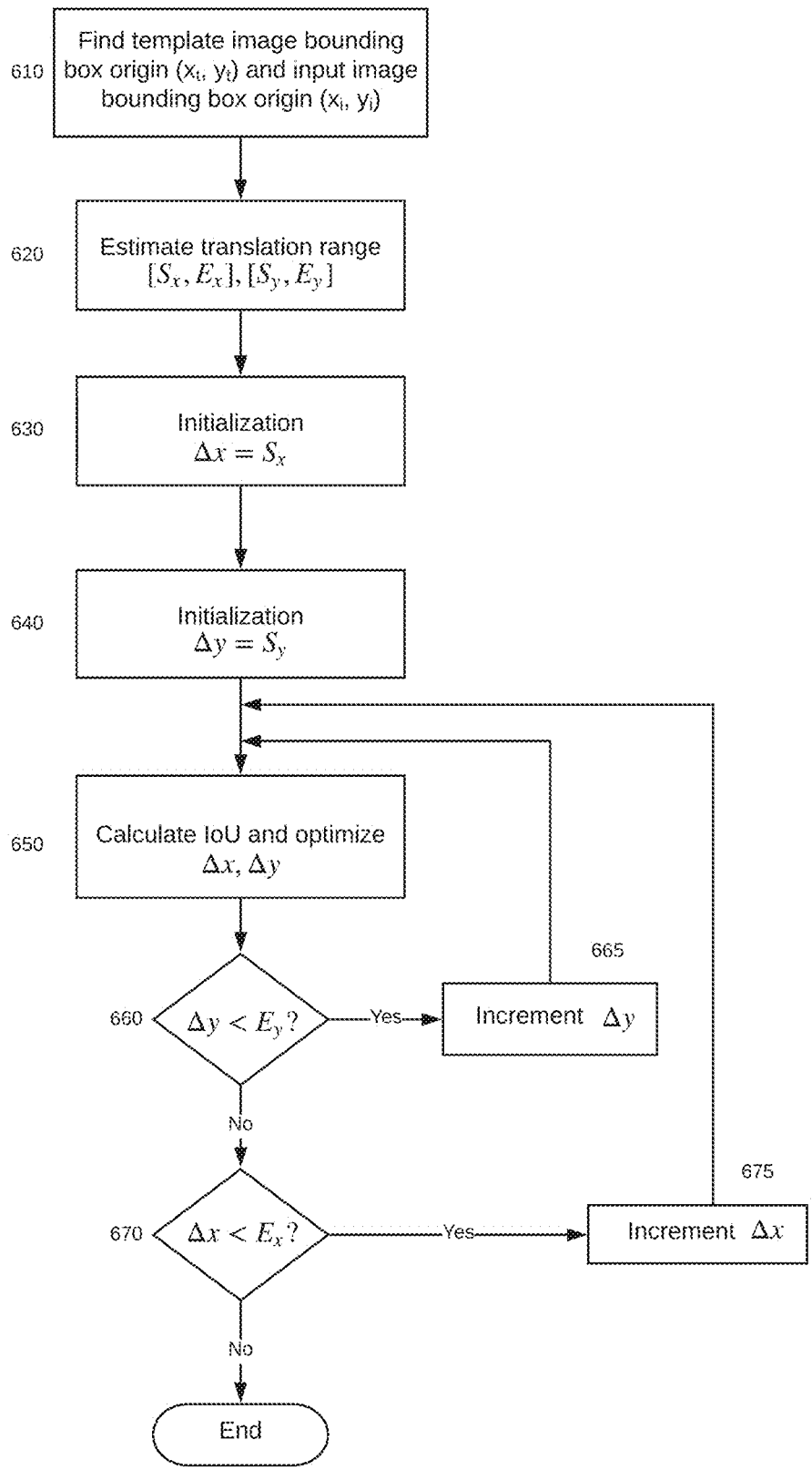
FIG. 6 is a high level flow chart depicting translation/alignment processing according to an embodiment.

FIG. 6 shows a flow for implementing the just-mentioned processing to align bounding boxes according to an embodiment. At 610, for a first bounding box to be matched in the template image and the input image, the respective x, y origins for the two images are determined. At 620, the range of necessary translation $S_x$ in the x direction and $S_y$ in the y direction is determined. In an embodiment, this will be the translation range for the bounding box for the input image, since presumably the positioning of the bounding boxes for the template image will have been set beforehand. At 630, the value for the amount of translation in the x direction is set $\Delta x=[S_x,E_x]$. At 640, the value for the amount of translation in the y direction for the bounding box is set $\Delta y=[S_y, E_y]$, where $$S_x = \begin{cases} x_t & \text{if } x_t < x_s \\ x_s & \text{otherwise} \end{cases}$$

$$S_y = \begin{cases} y_t & \text{if } y_t < y_s \\ y_s & \text{otherwise} \end{cases}$$

$$E_x = |W_t - W_s|$$

$$E_y = |H_t - H_s|$$

where $(x_t,y_t)$ and $(x_s,y_s)$ are the origin of the text region on the template image and the input image, respectively, and $(W_t,H_t)$ and $(W_s,H_s)$ are the width and the height of the text region on the template image and input image, respectively. By setting these values in this manner, when $\Delta x=0$ and $\Delta y=0$, translation has been addressed for that bounding box.

At 650, intersection over union is calculated, and an attempt is made to optimize $\Delta x$ and $\Delta y$ according to the immediately preceding equations. At 660, if $\Delta y$ is not yet optimized, at 665 $\Delta y$ is incremented and flow returns to 650. Once $\Delta y$ is optimized, at 670 $\Delta x$ is checked. If it is not yet optimized, at 675 $\Delta x$ is incremented, and flow again returns to 650.

The process just discussed addresses the alignment of a first bounding box prior to scaling. It is reasonable to assume that when the first bounding box is aligned, the remaining bounding boxes will be aligned. That is, if a first bounding box for an input image is off by, for example, 2 mm in the x direction and 1 mm in the y direction with respect to the corresponding bounding box in the template image, all of the bounding boxes in the input image will be off by the same amounts with respect to the template image. Even if scaling also is necessary, correcting scaling for a first bounding box after correcting alignment for the first bounding box will take care of the necessary scaling correction for the remaining bounding boxes in the input image. Thus, alignment will move the overall input image appropriately with respect to the template image, and scaling will size the overall input image to be like the template image.

From the foregoing, it can be understood that the respective procedures of translation and scaling are independent of each other. Once the bounding boxes are aligned in the X and Y directions (that is, when the input image bounding boxes are translated properly in the X and Y directions) using the above approach, scaling can be performed if necessary. As noted earlier, if an input image and its template image are scanned through the same scanner, scaling should not be necessary. If the images are scanned through different scanners, scaling could well be necessary. As a practical matter, the scaling difference between an input image and the corresponding template image will be small. Accordingly, once alignment is performed, it would be reasonable to expect that the IoU value will be close to 1, so that the loss value (1 minus the intersection over union) will be close to zero. That is, the bounding boxes in the input image and the bounding boxes in the template image would be expected to overlap each other substantially after translation/alignment. Consequently, the translation $\Delta x$ and $\Delta y$ calculated above need not be recalculated during or after a scaling process. Viewed another way, it should be noted that, after aligning bounding boxes, if scaling occurs after that alignment, it may be reasonable to expect that the remaining bounding boxes for the input image would be appropriately aligned and scaled, but it would be prudent to check anyway.

If there is significant necessary alignment and/or scaling for a next bounding box, there may well be something wrong with the scanning, or with the input image itself, leading to a further processing question that would need to be addressed before attempting such alignment and/or scaling of the remaining bounding boxes. Otherwise, performing alignment and/or scaling on a further bounding box may move a previous bounding box out of alignment, and/or adversely affect its scaling. Accordingly, for a next bounding box, if $\Delta x$ and/or $\Delta y$ are above a certain amount, or scaling requirements exceed a certain amount, it may be preferable to take some other action.

Looking now at scaling, it is necessary to look at scaling of both width and height, as it does not necessarily follow that aspect ratios of the same bounding box under examination in both the template image and the input image will be the same. Accordingly, the width and height scaling can be found to optimize the following equation:

$$\operatorname*{argmin}_{\alpha,\beta} L_{IoU}$$

where α represents width scaling and β represents height scaling.

Looking again at bounding boxes of words or characters in the template image and the input image, to find scale change the above equation can be expressed as follows:

$$\operatorname*{argmin}_{\alpha,\beta} \sum_i^n \sum_j^m \frac{I(r_i(\alpha w, \beta h), r_j(w, h))}{U(r_i(\alpha w, \beta h), r_j(w, h))}$$

where n and m are the number of bounding boxes for a template image and an input image, respectively; $r_i$ and $r_j$ are bounding boxes for a template image and an input mage, respectively; w and h are width and height of a bounding box, respectively; and α and β are scale in width and height, respectively.

Figure 7:
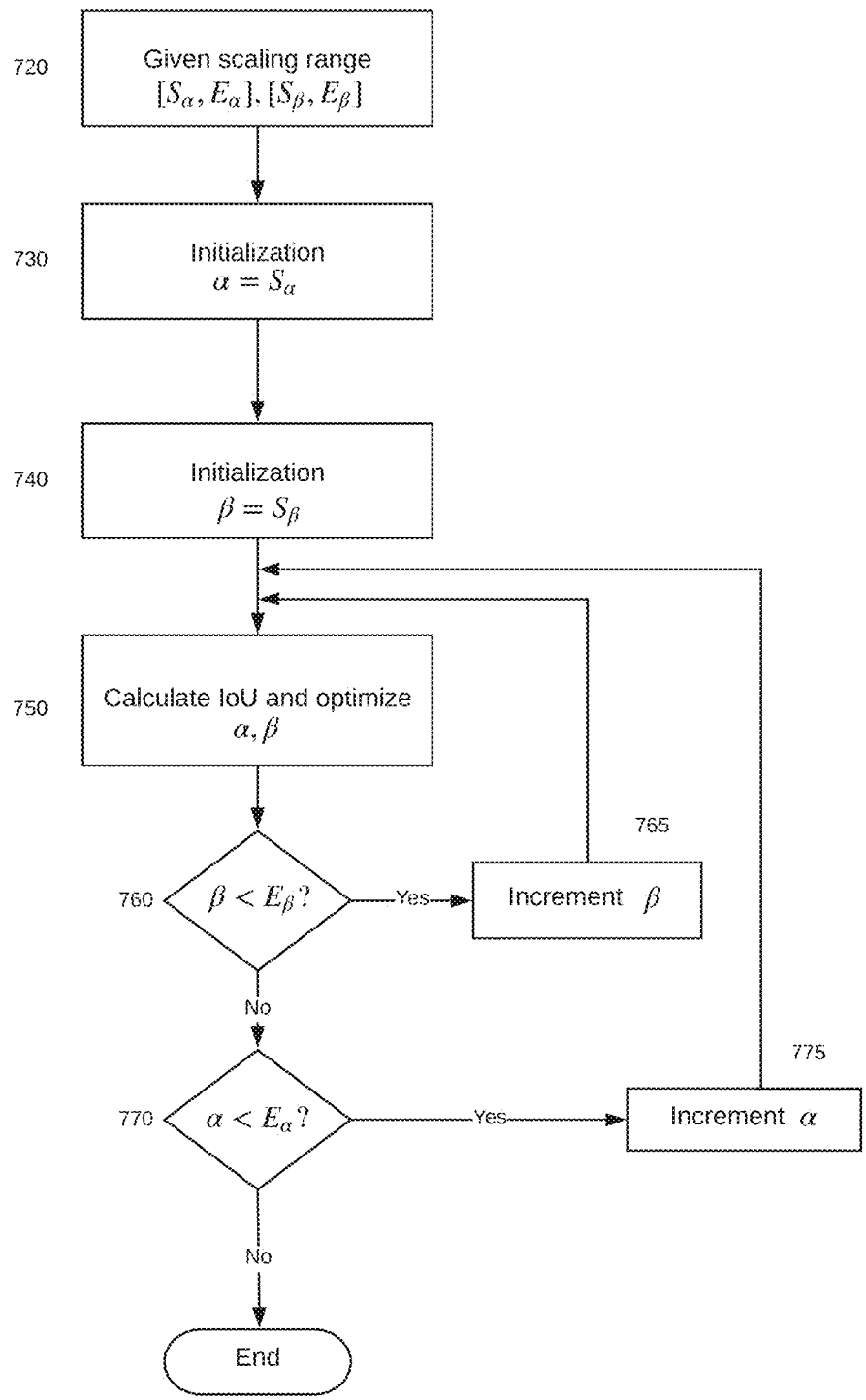
FIG. 7 is a high level flow chart depicting scale processing according to an embodiment.

FIG. 7 shows a flow for implementing the just-mentioned processing to scale bounding boxes according to an embodiment. At 720, the scaling range in width $[S_\alpha, E_\alpha]$ and height $[S_\beta, E_\beta]$, respectively, are determined. In an embodiment, respective heights of an input image bounding box and a template image bounding box, and respective widths of that input image bounding box and template image bounding box may be examined. In an embodiment, the same respective bounding boxes for the input image and the template image that were used to determine translation/alignment also may be used for scaling. In an embodiment, one or more other bounding box pairs may be used.

At 730, the height scale for α is initialized, and at 740, the width scale for β is initialized. At 750, intersection over union is calculated, and an attempt is made to optimize α and β according to the immediately preceding equation. At 760, if β is not yet optimized, at 765 β is incremented and flow returns to 750. Once β is optimized, at 770 a is checked. If it is not yet optimized, at 775 α is incremented, and flow again returns to 750.

In the embodiments described thus far, alignment is performed before scaling, because in this fashion a common starting point for determining the need for and/or amount of scaling may be ascertained. There may be a circumstance in which scaling between an input form and a template form is known beforehand, in which case determining translation and alignment may be all that is necessary.

In summary and in addition, the inventive approach described herein provides at least the following benefits in aligning form images. First, the technique is robust and accurate for low quality images and scanning artifacts such as smeared characters, missed characters, etc., which known approaches often fail to handle adequately. Second, the approach is highly computationally efficient. Among other things, identification of particular words, characters, or even pixels is not required. Instead, bounding box identification (through, for example, text location) is sufficient. Such identification can be done using techniques that do not require intricate text recognition. Relatedly, it is possible to employ standard techniques for determining intersection over union. Third, the technique is insensitive to noise and other artifacts such as punch holes, handwritten notes, and the like.

While the foregoing describes embodiments according to aspects of the invention, the invention is not to be considered as limited to those embodiments or aspects. Ordinarily skilled artisans will appreciate variants of the invention within the scope and spirit of the appended claims.

What is claimed is:

1. A method comprising:
   responsive to receipt of an input image containing text, identifying a template image that matches said input image;
   responsive to an identification of text, defining a bounding box around the identified text;
   matching the bounding box in the input image with a bounding box in the template image;
   responsive to a determination that the bounding box in the input image is not aligned with the bounding box in the template image, aligning the bounding box in the input image with the bounding box in the template image;
   responsive to a determination that the bounding box in the input image is not the same size as the bounding box in the template image, scaling the bounding box in the input image to be substantially the same size as the bounding box in the template image; and
   responsive to a determination that the bounding box in the input image and the bounding box in the template image are aligned with each other and have the same scale, determining that the input image and the template image are aligned with each other and have the same scale.

2. A method as claimed in claim 1, wherein the aligning comprises:
   locating a template image bounding box origin and an input image bounding box origin;
   estimating a range of translation to match the template image bounding box origin with the input image bounding box origin;
   setting a first translation value for translation along a first axis and a second translation value for translation along a second axis to match the template image bounding box origin with the input image bounding box origin;
   calculating an intersection over union for the image bounding box and the template bounding box;
   responsive to a determination that translation along the first axis is required, incrementing the first translation value;
   responsive to a determination that translation along the second axis is required, incrementing the second translation value.

3. A method as claimed in claim 2, further comprising repeating incrementing the first translation value until translation along the first axis is complete, and repeating incrementing the second translation value until translation along the second axis is complete and the template image bounding box origin and the input image bounding box origin match.

4. A method as claimed in claim 1, wherein the scaling comprises:
   estimating a range of scaling to match a size of the template image bounding box and a size of the input image bounding box;
   setting a first scaling value for scaling along a first axis and a second scaling value for scaling along a second axis to match the size of the template image bounding box and the size of the input image bounding box;

calculating an intersection over union for the image bounding box and the template bounding box;

responsive to a determination that scaling along the first axis is required, incrementing the first scaling value;

responsive to a determination that scaling along the second axis is required, incrementing the second scaling value.

5. A method as claimed in claim 4, further comprising repeating incrementing the first scaling value until width scaling along the first axis is complete and repeating incrementing the second scaling value until width scaling along the second axis is complete and the template image bounding box and the input image bounding box are substantially the same size.

6. A method as claimed in claim 1 wherein, responsive to a determination that an intersection over union of the bounding box in the input image and the bounding box in the template exceeds a predetermined amount, aligning and scaling are not required.

7. A method as claimed in claim 1 wherein, after the aligning, responsive to a determination that an intersection over union of the bounding box in the input image and the bounding box in the template exceeds a predetermined amount, scaling is not required.

8. A method as claimed in claim 1, wherein the determination that the bounding box in the input image is not aligned with the bounding box in the template image is made by calculating an intersection over union for the two bounding boxes and determining whether the calculated intersection over union falls below a predetermined amount.

9. A method as claimed in claim 1, wherein the determination that the bounding box in the input image is not the same size as the bounding box in the template image is made by calculating an intersection over union for the two bounding boxes and determining whether the calculated intersection over union falls below a predetermined amount.

10. A method as claimed in claim 1, further comprising, responsive to a determination that additional alignment and scaling of the input image relative to the template image is required, repeating the providing and matching for a different bounding box in each of the input image and the template image, and performing the aligning and scaling using the different bounding box in each of the input image and the template image.

11. A computer-implemented system comprising at least one processor, volatile memory, and non-volatile storage, the system, when the at least one processor is programmed, performing the following method:

responsive to an identification of text, defining a bounding box around the identified text;

matching the bounding box in the input image with a bounding box in the template image;

responsive to a determination that the bounding box in the input image is not aligned with the bounding box in the template image, aligning the bounding box in the input image with the bounding box in the template image;

responsive to a determination that the bounding box in the input image is not the same size as the bounding box in the template image, scaling the bounding box in the input image to be substantially the same size as the bounding box in the template image; and responsive to a determination that the bounding box in the input image and the bounding box in the template image are aligned with each other and have the same scale, determining that the input image and the template image are aligned with each other and have the same scale.

12. A computer-implemented system as claimed in claim 11, wherein the aligning comprises:

locating a template image bounding box origin and an input image bounding box origin;

estimating a range of translation to match the template image bounding box origin with the input image bounding box origin;

setting a first translation value for translation along a first axis and a second translation value for translation along a second axis to match the template image bounding box origin with the input image bounding box origin;

calculating an intersection over union for the image bounding box and the template bounding box;

responsive to a determination that translation along the first axis is required, incrementing the first translation value;

responsive to a determination that translation along the second axis is required, incrementing the second translation value.

13. A computer-implemented system as claimed in claim 12, the method further comprising repeating incrementing the first translation value until translation along the first axis is complete, and repeating incrementing the second translation value until translation along the second axis is complete and the template image bounding box origin and the input image bounding box origin match.

14. A computer-implemented system as claimed in claim 11, wherein the scaling comprises:

estimating a range of scaling to match a size of the template image bounding box and a size of the input image bounding box;

setting a first scaling value for scaling along a first axis and a second scaling value for scaling along a second axis to match the size of the template image bounding box and the size of the input image bounding box;

calculating an intersection over union for the image bounding box and the template bounding box;

responsive to a determination that scaling along the first axis is required, incrementing the first scaling value;

responsive to a determination that scaling along the second axis is required, incrementing the second scaling value.

15. A computer-implemented system as claimed in claim 14, the method further comprising repeating incrementing the first scaling value until width scaling along the first axis is complete and repeating incrementing the second scaling value until width scaling along the second axis is complete and the template image bounding box and the input image bounding box are substantially the same size.

16. A computer-implemented system as claimed in claim 11 wherein, responsive to a determination that an intersection over union of the bounding box in the input image and the bounding box in the template exceeds a predetermined amount, aligning and scaling are not required.

17. A computer-implemented system as claimed in claim 11 wherein, after the aligning, responsive to a determination that an intersection over union of the bounding box in the input image and the bounding box in the template exceeds a predetermined amount, scaling is not required.

18. A computer-implemented system as claimed in claim 11, wherein the determination that the bounding box in the input image is not aligned with the bounding box in the template image is made by calculating an intersection over union for the two bounding boxes and determining whether the calculated intersection over union falls below a predetermined amount.

19. A computer-implemented system as claimed in claim 11, wherein the determination that the bounding box in the input image is not the same size as the bounding box in the template image is made by calculating an intersection over union for the two bounding boxes and determining whether the calculated intersection over union falls below a predetermined amount.

20. A computer implemented system according to claim 11, further comprising a neural network to perform at least one of the aligning and the scaling.

\* \* \* \* \*